US010159089B2

(12) United States Patent
Luo et al.

(10) Patent No.: US 10,159,089 B2
(45) Date of Patent: Dec. 18, 2018

(54) UPLINK LISTEN BEFORE TALK OPERATION

(71) Applicant: QUALCOMM Incorporated, San Diego, CA (US)

(72) Inventors: Tao Luo, San Diego, CA (US); Durga Prasad Malladi, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 15/077,587

(22) Filed: Mar. 22, 2016

(65) Prior Publication Data
US 2016/0309498 A1 Oct. 20, 2016

Related U.S. Application Data

(60) Provisional application No. 62/150,189, filed on Apr. 20, 2015.

(51) Int. Cl.
H04W 72/12 (2009.01)
H04W 72/14 (2009.01)
H04W 74/08 (2009.01)
H04W 16/14 (2009.01)

(52) U.S. Cl.
CPC ....... *H04W 72/1268* (2013.01); *H04W 72/14* (2013.01); *H04W 74/0808* (2013.01); *H04W 16/14* (2013.01)

(58) Field of Classification Search
None
See application file for complete search history.

(56) References Cited

U.S. PATENT DOCUMENTS

2014/0036818 A1  2/2014  Koskela et al.
2014/0335876 A1  11/2014 Ratasuk et al.
2014/0362780 A1  12/2014 Malladi et al.
2016/0233989 A1* 8/2016  Belghoul .............. H04L 1/1887
(Continued)

OTHER PUBLICATIONS

Intel Corporation, "Uplink Transmission with LBT," 3GPP TSG-RAN WG2 #89bis, Bratislava, Slovakia, R2-151102, Apr. 20-24, 2015, 6 pgs., XP_50936083A, 3rd Generation Partnership Project.
(Continued)

*Primary Examiner* — Yaotang Wang
(74) *Attorney, Agent, or Firm* — Holland & Hart LLP

(57) ABSTRACT

Methods, systems, and devices for wireless communication are described. A wireless device may determine whether a source carrier for an uplink grant is in licensed or unlicensed spectrum and then select a listen-before-talk (LBT) procedure for accessing a shared spectrum channel. For example, the device may select one range parameter (e.g., q value) for a backoff procedure of a clear channel assessment (CCA) if the source carrier is in unlicensed spectrum, and a different (e.g., larger) range parameter if the source carrier is in licensed spectrum. In some cases, the device may operate in a stand-alone operating mode and the source carrier may be identified based on the mode. In some cases, the device may receive signaling that indicates a carrier configuration, and may select the LBT procedure based on whether a carrier configured on unlicensed spectrum is self-scheduled or cross-carrier scheduled.

56 Claims, 14 Drawing Sheets

(56) References Cited

U.S. PATENT DOCUMENTS

2017/0150367 A1* 5/2017 Han .................... H04W 16/14
2017/0339721 A1* 11/2017 Mukherjee ........ H04W 74/0816

OTHER PUBLICATIONS

ISA/EP, International Search Report and Written Opinion of the International Searching Authority, Int'l. App. No. PCT/US2016/023732, dated Jun. 2, 2016, European Patent Office, Rijswijk, NL, 14 pgs.

Nvidia, "Control Signaling Aspects of LAA," 3GPP TSG-RAN WG1 #80bis, Belgrade, Serbia, R1-152093, Apr. 20-24, 2015, 5 pgs., XP_50934941A, 3rd Generation Partnership Project.

* cited by examiner

UPLINK LISTEN BEFORE TALK OPERATION

CROSS REFERENCES

The present Application for Patent claims priority to U.S. Provisional Patent Application No. 62/150,189 by Luo et al., entitled "Uplink Listen Before Talk Operation," filed Apr. 20, 2015, assigned to the assignee hereof.

BACKGROUND

The following relates generally to wireless communication, and more specifically to uplink listen-before-talk (LBT) operation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some cases, a user equipment (UE) operating in shared or unlicensed spectrum may perform a listen-before-talk (LBT) procedure, which may include as a clear channel assessment (CCA) or enhanced clear channel assessment (eCCA) to determine whether the channel is available for communication. If a UE and a base station both use LBT, uplink transmission opportunities may be limited. For example, a base station may perform a CCA to send an uplink grant to a UE in an unlicensed carrier; the UE may then perform another CCA to transmit the corresponding uplink message associated with the uplink grant. Each CCA performed may introduce the possibility of delay or disruption.

SUMMARY

A wireless device may determine whether a source carrier for an uplink grant is in licensed or unlicensed spectrum, and the select a listen-before-talk (LBT) procedure for accessing a shared spectrum channel. For example, the device may select one range parameter (e.g., q value) for a backoff procedure of a clear channel assessment (CCA) if the source carrier is in unlicensed spectrum, and a different (i.e., larger) range parameter if the source carrier is in licensed spectrum. In some cases, the device may operate in a stand-alone operating mode and the source carrier may be identified based at least in part on the mode. In some cases, the device may receive signaling, which may indicate whether a carrier configured on unlicensed spectrum is self-scheduled or cross-carrier scheduled, and the device may select the LBT procedure accordingly.

A method of wireless communication is described. The method may include identifying a source carrier for an uplink grant, and determining an LBT procedure for accessing a channel of a shared spectrum based at least in part on the source carrier for the uplink grant.

An apparatus for wireless communication is additionally or alternatively described. The apparatus may include means for identifying a source carrier for an uplink grant, and means for determining an LBT procedure for accessing a channel of a shared spectrum based at least in part on the source carrier for the uplink grant.

A further apparatus for wireless communication is additionally or alternatively described. The apparatus may include a processor and memory coupled with the processor. The processor may be configured to identify a source carrier for an uplink grant, and determine an LBT procedure for accessing a channel of a shared spectrum based at least in part on the source carrier for the uplink grant.

A non-transitory computer-readable medium for storing instructions executable by a processor is additionally or alternatively described. The computer-readable medium may include instructions to identify a source carrier for an uplink grant, and determine an LBT procedure for accessing a channel of a shared spectrum based at least in part on the source carrier for the uplink grant.

Some examples of the method, apparatuses, or non-transitory computer-readable medium described herein may additionally or alternatively include processes, features, means, or instructions for determining the LBT procedure include determine a CCA period based at least in part on the source carrier for the uplink grant. Additionally or alternatively, in some examples the CCA period includes a first duration if the source carrier is in a shared spectrum and the CCA period includes a second duration if the source carrier is in a licensed spectrum, such that the second duration is greater than the first duration.

In some examples of the method, apparatuses, or non-transitory computer-readable medium described herein, determining the LBT procedure includes determine a CCA procedure based at least in part on the source carrier for the uplink grant. Additionally or alternatively, in some examples, the determined CCA procedure includes a CCA procedure without a backoff procedure.

In some examples of the method, apparatuses, or non-transitory computer-readable medium described herein, the determined CCA procedure includes a linear random or an exponential backoff procedure. Additionally or alternatively, some examples may include processes, features, means, or instructions for determining an LBT priority class for the exponential backoff procedure. Additionally or alternatively, some examples may include processes, features, means, or instructions for selecting a first range parameter for the backoff procedure if the source carrier is in a shared spectrum, selecting a second range parameter for the backoff procedure if the source carrier is in a licensed spectrum, and the second range parameter is greater than the first range parameter, the first range parameter and the second range parameter are different from a range parameter associated with a base station from which the uplink grant is received.

In some examples of the method, apparatuses, or non-transitory computer-readable medium described herein, identifying the source carrier for the uplink grant includes identifying a carrier in the shared spectrum. Additionally or alternatively, some examples may include processes, features, means, or instructions for determining that a UE is in a stand-alone operating mode, and the source carrier is identified based at least in part on the determination that the UE is in the stand-alone operating mode.

In some examples of the method, apparatuses, or non-transitory computer-readable medium described herein, identifying the source carrier for the uplink grant includes identifying a carrier in a licensed spectrum, such that the uplink grant is cross-carrier controlled by the identified carrier. Additionally or alternatively, some examples may include processes, features, means, or instructions for receiving signaling indicative of a cross-carrier scheduling configuration, and the carrier in the licensed spectrum is identified based at least in part on the received signaling.

In some examples of the method, apparatuses, or non-transitory computer-readable medium described herein, a preamble transmitted using resources indicated by the uplink grant is based at least in part on the source carrier for the uplink grant. Additionally or alternatively, in some examples the source carrier includes a carrier in the shared spectrum and the preamble includes a wireless local area network (WLAN) preamble.

BRIEF DESCRIPTION OF THE DRAWINGS

Aspects of the disclosure are described in reference to the following figures.

DETAILED DESCRIPTION

In some cases, a user equipment (UE) operating in shared spectrum or unlicensed spectrum may perform a listen-before-talk (LBT) procedure, such as a CCA or eCCA to determine whether the channel is available for communication. UEs may perform the CCA/eCCA operation using different parameters or different procedures based on the circumstances, or based on the UE performing the procedure. For instance, in some cases, CCA/eCCA operation is not performed before transmission. In some cases, CCA/eCCA may be performed with or without a backoff. If the procedure includes backoff, it may involve a linear random backoff (e.g., option B defined by the European Telecommunications Standards Institute (ETSI) broadband radio access network (BRAN) standard). As another example, CCA/eCCA procedures may involve exponential backoff (e.g., option A of ETSI BRAN, or enhanced distributed channel access (EDCA) in a wireless local area network (WLAN)). The average time of a successful CCA/eCCA may vary based on the specific procedures performed.

If a UE and a base station both use LBT, uplink transmission opportunities may be limited. For example, a base station may perform a CCA to send an uplink grant to a UE in an unlicensed carrier. The UE may then perform another CCA to transmit the corresponding PUSCH or PUCCH message associated with the uplink grant. Each CCA performed may introduce the possibility of delay or disruption.

In some cases, uplink transmission opportunities may be improved with cross-carrier assignment from a licensed spectrum. Aspects of the LBT procedure may be linked to the source of uplink grant. For example, when an uplink grant is scheduled using unlicensed spectrum a shorter CCA/eCCA operation may be performed. This may apply when a CCA operation is performed right before uplink transmission. When an uplink grant is cross-carrier scheduled on a licensed carrier, a longer CCA/eCCA operation may be performed. The length of the CCA may be adjusted by increasing a CCA duration parameter (e.g., a backoff period), using a different range parameter (e.g., a q value), modifying an initial defer operation, or adjusting a success threshold.

Aspects of the disclosure are described below in the context of a wireless communication system. Specific examples are then described for grants received via licensed and unlicensed spectrum. These and other aspects of the disclosure are further illustrated by and described with reference to apparatus diagrams, system diagrams, and flowcharts that relate to uplink listen-before-talk operation.

Figure 1:
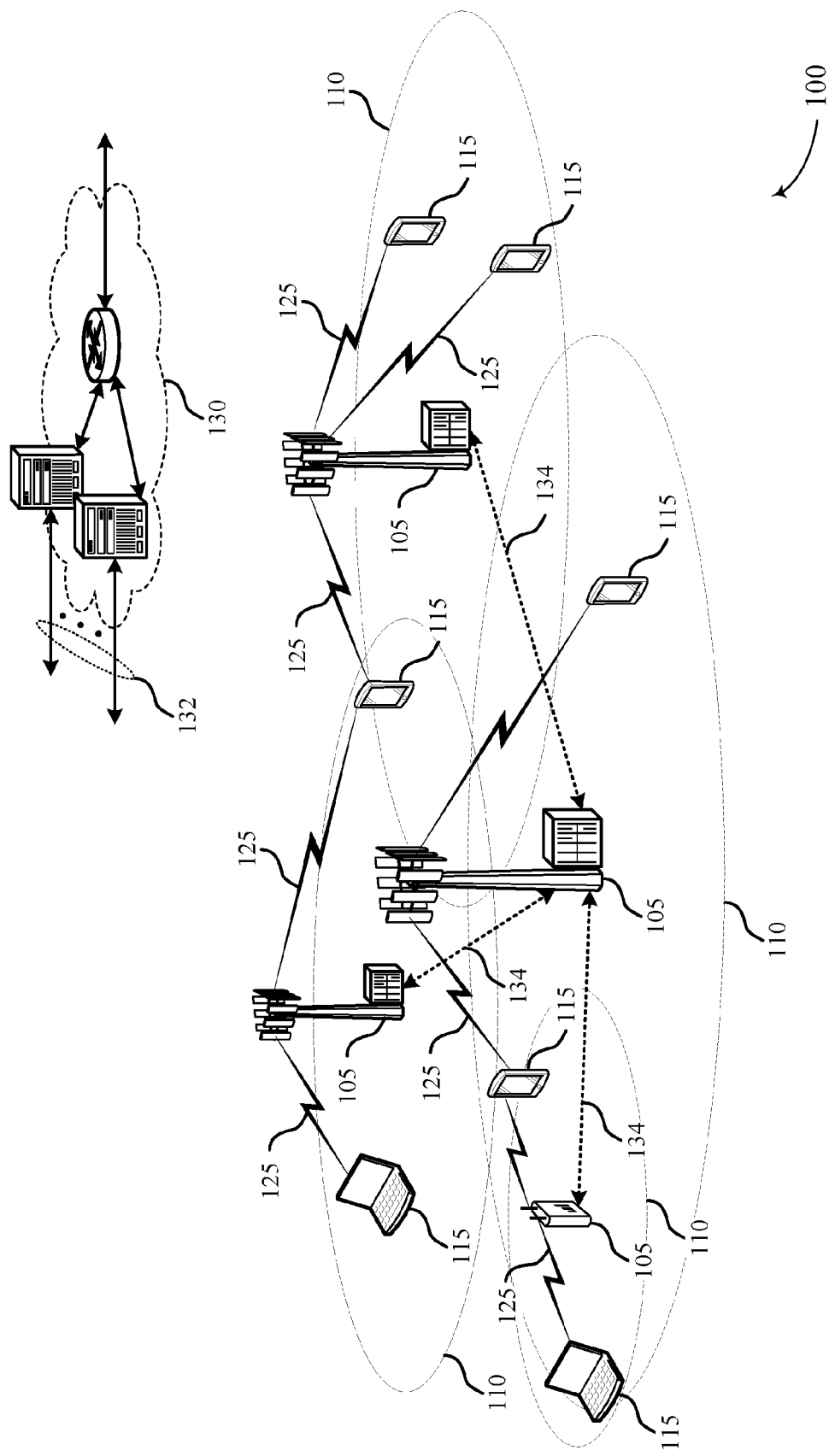
FIG. 1 illustrates an example of a wireless communications system that supports uplink listen-before-talk operation in accordance with various aspects of the present disclosure.

FIG. 1 illustrates an example of a wireless communications system 100 in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-Advanced (LTE-A) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Communication links 125 may include channels operating in licensed, shared, or unlicensed spectrum.

Broadly speaking, the unlicensed spectrum in some jurisdictions may range from 600 Megahertz (MHz) to 6 Gigahertz (GHz). As used herein, the term "unlicensed spectrum" or "shared spectrum" may thus refer to industrial, scientific and medical (ISM) radio bands, irrespective of the frequency of those bands. In some examples, unlicensed spectrum is the U-NII radio band, which may additionally or alternatively be referred to as the 5 GHz or 5G band. By contrast, the term "licensed spectrum" or "cellular spectrum" may be used herein to refer to wireless spectrum utilized by wireless network operators under administrative license from a governing agency.

UEs 115 may be dispersed throughout the wireless communications system 100, and each UE 115 may be stationary or mobile. A UE 115 may additionally or alternatively be referred to as a mobile station, a subscriber station, a remote unit, a wireless device, an access terminal, a handset, a user agent, a client, or some other suitable terminology. A UE 115 may additionally or alternatively be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may additionally or alternatively be referred to as eNodeBs (eNBs) 105.

The communication links 125 may include one or more frequency ranges organized into carriers. A carrier may additionally or alternatively be referred to as a CC, a layer, a channel, etc. The term "component carrier" may refer to each of the multiple carriers utilized by a UE in carrier aggregation (CA) operation, and may be distinct from other portions of system bandwidth. For instance, a component carrier may be a relatively narrow-bandwidth carrier susceptible of being utilized independently or in combination with other component carriers. Each component carrier may provide the same capabilities as an isolated carrier based on release 8 or release 9 of the Long Term Evolution (LTE) standard. Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. A carrier used for downlink (DL) may be referred to as a DL CC, and a carrier used for uplink (UL) may be referred to as an UL CC. A UE 115 may be configured with multiple DL component carriers (CCs) and one or more UL CCs for carrier aggregation. Each carrier may be used to transmit control information (e.g., reference signals, control channels, etc.), overhead information, data, etc. A UE 115 may communicate with a single base station 105 utilizing multiple carriers, and may additionally or alternatively communicate with multiple base stations simultaneously on different carriers.

Each cell of a base station 105 may include an UL component carrier (CC) and a DL CC. The geographic coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., acknowledgement (ACK)/negative acknowledgment (NACK), channel quality indicator (CQI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell. In other cases, one or more secondary cell (SCells) may be designated to carry physical uplink control channel (PUCCH), and the SCells may be organized into PUCCH groups based on which CC is used to carry the associated UL control information. Some wireless networks may utilize enhanced CA operations based on a large number of carriers (e.g., between 5 and 32 carriers), operation in shared or unlicensed spectrum, or use of enhanced CCs.

In some cases, a UE 115 may be served by cells from two or more base stations 105 that are connected by a non-ideal backhaul link 134 in dual connectivity operation. For example, the connection between the serving base stations 105 may not be sufficient to facilitate precise timing coordination. Thus, in some cases, the cells serving a UE 115 may be divided into multiple timing adjustment group (TAGs). Each TAG may be associated with a different timing offset, such that the UE 115 may synchronize UL transmissions differently for different UL carriers.

A base station may schedule a UE 115 by sending grants via a physical downlink control channel (PDCCH). PDCCH grants may be associated with the carrier they are sent on, or for another carrier (i.e., cross carrier scheduling). PDCCH carries downlink control information (DCI) in control channel elements (CCEs), which may include of nine logically contiguous resource element groups (REGs), where each REG contains 4 resource elements (REs). DCI includes information regarding DL scheduling assignments, UL resource grants, transmission scheme, UL power control, hybrid automatic repeat request (HARQ) information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs multiple input multiple output (MIMO), the DCI may include additional signaling information. DCI size and format depend on the amount of information as well as factors such as bandwidth, the number of antenna ports, and duplexing mode.

In some cases, a UE 115 or base station 105 may operate in a shared or unlicensed frequency spectrum. These devices may perform a clear channel assessment (CCA) prior to communicating in order to determine whether the channel is available. A CCA may include an energy detection procedure to determine whether there are any other active transmissions. For example, the device may infer that a change in a received signal strength of a power meter indicates that a channel is occupied. Specifically, signal power is that is concentrated in a certain bandwidth and exceeds a predetermined noise floor may indicate another wireless transmitter. A CCA may additionally or alternatively include detection of specific sequences that indicate use of the channel. For example, another device may transmit a specific preamble prior to transmitting a data sequence.

Wireless communications system 100 may utilize one or more enhanced component carriers (eCCs), which may operate in unlicensed or shared spectrum bandwidths. An enhanced component carrier (eCC) may be characterized, for example, by one or more features including: flexible bandwidth, different transmission time interval (TTIs), and modified control channel configuration. In some cases, an eCC may be associated with a CA configuration or a dual connectivity configuration (e.g., when multiple serving cells have a suboptimal backhaul link). An eCC characterized by flexible bandwidth may include one or more segments that may be utilized by UEs 115 that do are not capable of monitoring the whole bandwidth or prefer to use a limited bandwidth (e.g., to conserve power).

In some cases, an eCC may utilize a different TTI length than other CCs, which may include use of a reduced or variable symbol duration as compared with TTIs of the other CCs. The symbol duration may remain the same, in some cases, but each symbol may represent a distinct TTI. In some examples, an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may additionally or alternatively be associated with increased subcarrier spacing. In conjunction with the reduced TTI length, an eCC may utilize dynamic time division duplex (TDD) operation (i.e., it may switch from DL to UL operation for short bursts according to dynamic conditions.)

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may additionally or alternatively include modified or additional HARQ related control information.

As described herein, a UE 115 or base station 105 may determine whether a source carrier for an uplink grant is in licensed or unlicensed spectrum, and the select an LBT procedure for accessing a shared spectrum channel. In some cases, range parameters of a UE and range parameters of a base station may be different (e.g., smaller, larger) based at least in part on whether the source carrier is in an unlicensed spectrum or a licensed spectrum. For example, a UE 115 or base station 105 may select one range parameter (e.g., q value) for a backoff procedure of a CCA if the source carrier is in unlicensed spectrum, and a different (e.g., larger) range parameter if the source carrier is in licensed spectrum. In some cases, a first range parameter and a second range parameter (e.g. of a UE for a backoff procedure) are different from a range parameter associated with a base station from which the uplink grant is received. In some cases, the UE 115 or base station 105 may operate in a stand-alone operating mode and the source carrier may be identified based on the mode. In some cases, the UE 115 or base station 105 may receive signaling via a cross-carrier scheduling configuration and may select the LBT procedure based on the scheduling carrier.

Figure 2:
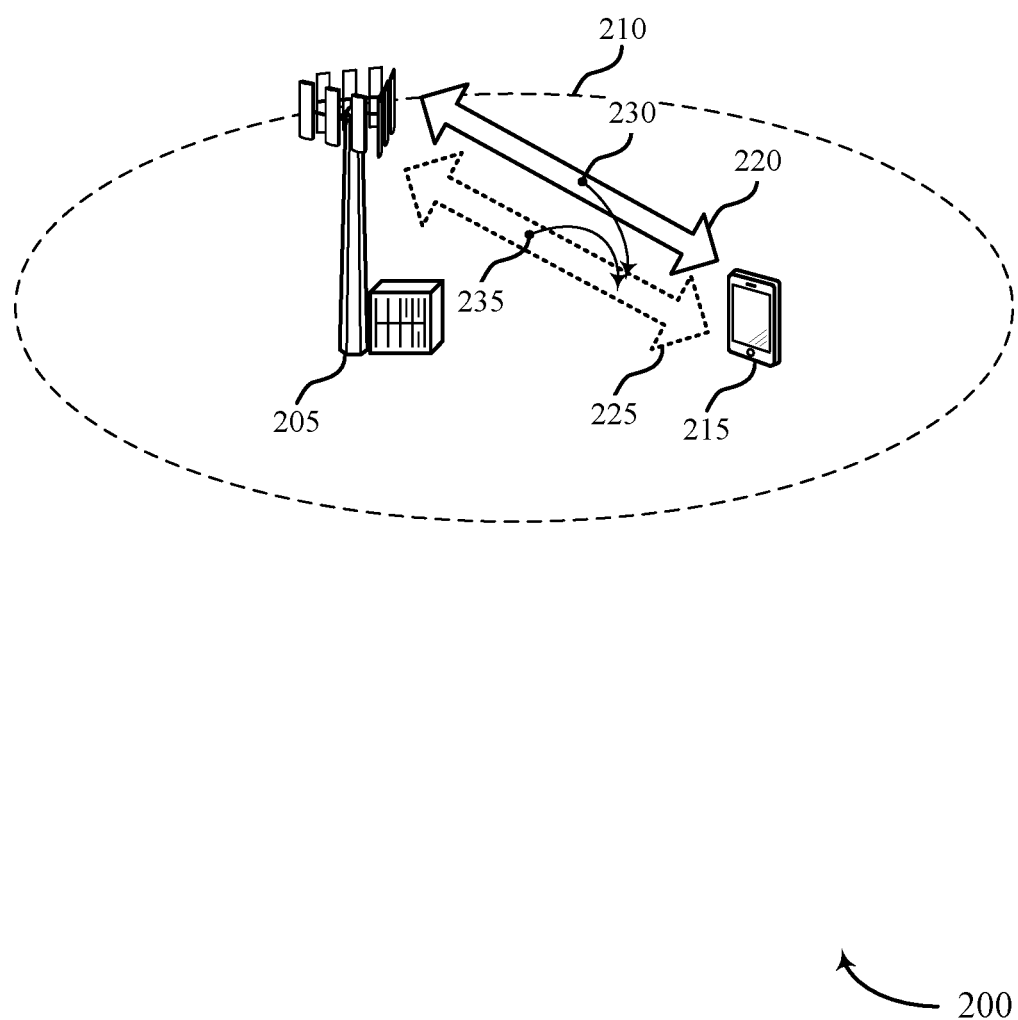
FIG. 2 illustrates an example of a wireless communications system that supports uplink listen-before-talk operation in accordance with various aspects of the present disclosure.

FIG. 2 illustrates an example of a wireless communications system 200 for uplink listen-before-talk operation in accordance with various aspects of the present disclosure. Wireless communications system 200 may include UE 215 and base station 205, which may be examples of a UE 115 base station 105 described with reference to FIG. 1. UE 215 and base station 205 may communicate using a licensed spectrum carrier 220, a shared spectrum carrier 225 (e.g., a carrier operating in shared or unlicensed spectrum), or both. Base station 205 may schedule shared spectrum communications for UE 215 using a cross carrier grant 230 or same carrier (e.g., self-scheduled) grant 235.

That is, UE 215 may operate in shared spectrum or unlicensed spectrum and may perform a LBT procedure, such as a CCA or enhanced clear channel assessment (eCCA) to determine whether a channel is available for communication prior to using it. UE 215 may perform the CCA/eCCA operation using different parameters or different procedures based on the circumstances or based on device characteristics. In some cases, CCA/eCCA operation is not performed before transmission. CCA/eCCA may be performed with or without a backoff. For example, a CCA/eCCA procedures may include a linear random backoff. As another example, CCA/eCCA procedures may exponential backoff. The average time of a successful CCA/eCCA may vary based on the specific procedures performed.

If UE 215 and base station 205 both use LBT, uplink transmission opportunities may be limited. For example, base station 205 may perform a CCA to send an uplink grant to UE 215 in an unlicensed carrier, using, for example, same carrier grant 235. UE 215 may then perform another CCA to transmit the corresponding PUSCH or PUCCH message associated with the uplink grant. Each CCA performed may introduce the possibility of delay or disruption.

In some cases, uplink transmission opportunities may be improved with cross-carrier assignment from a licensed spectrum. Aspects of the LBT procedure may be linked to the source of uplink grant. For example, when an uplink grant is scheduled using same carrier grant 235 a shorter CCA/eCCA operation may be performed. This may apply when a CCA operation is performed right before uplink transmission. When base station 205 schedules UE 215 using cross carrier grant 230, a longer CCA/eCCA operation may be performed. The length of the CCA may be adjusted by increasing a CCA duration parameter (e.g., a backoff period), using a different range parameter (e.g., a q value), modifying an initial defer operation, or adjusting a success threshold. Thus, the delay or disruption caused by performing CCA multiple times in the unlicensed spectrum may be mitigated.

Figures 3A, 3B:
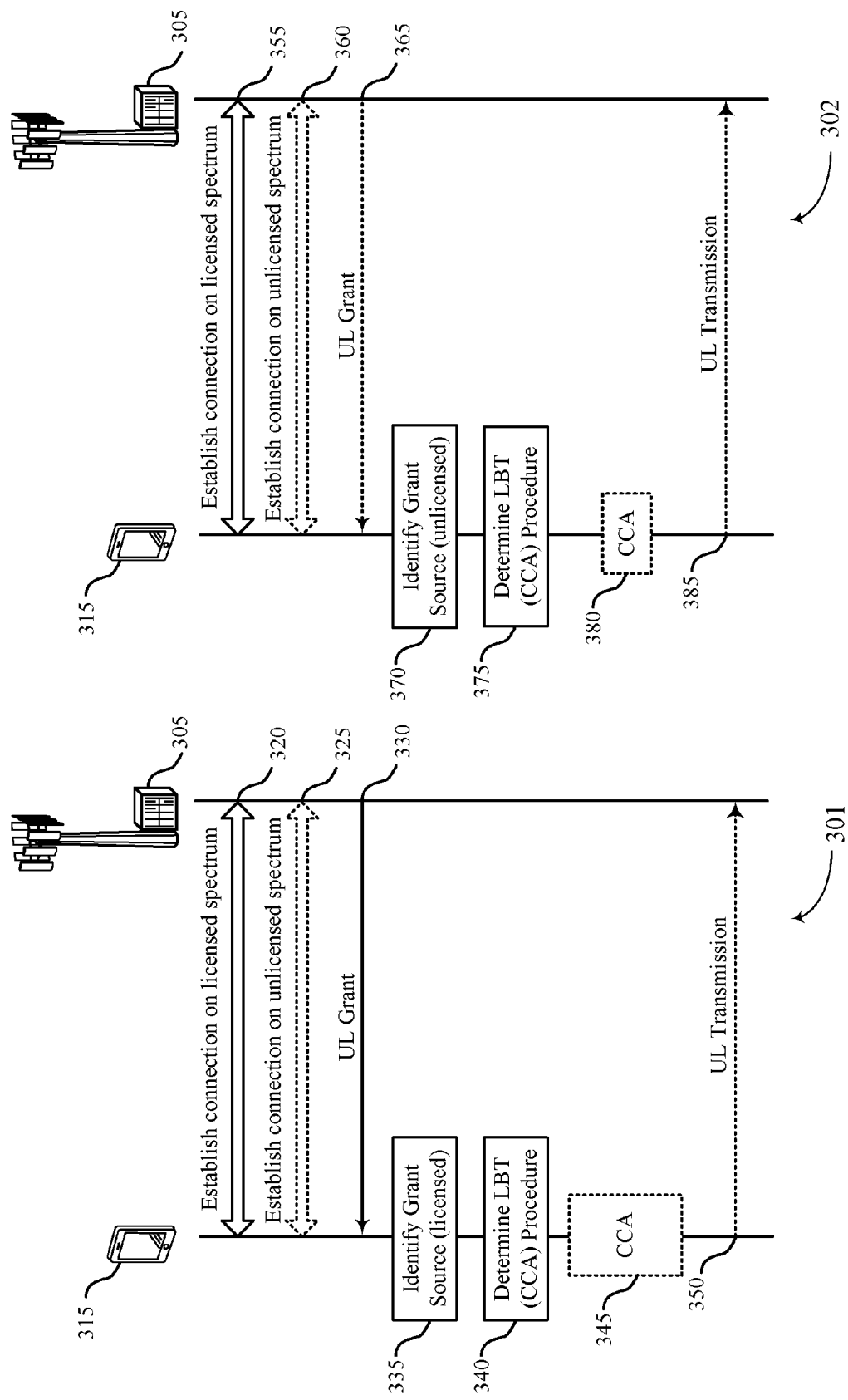
FIG. 3 illustrates an example of a process flow in a system that supports uplink listen-before-talk operation in accordance with various aspects of the present disclosure.

FIG. 3A illustrates an example of a process flow 301 for uplink listen-before-talk operation using cross carrier scheduling in accordance with various aspects of the present disclosure. Process flow 301 may include a UE 315 and base station 305, which may be examples of a UE and base station described with reference to FIGS. 1 and 2.

At 320, UE 315 and base station 305 may establish a connection using licensed spectrum. At 325, UE 315 and base station 305 may establish a connection using shared or unlicensed spectrum. In some cases, both connections may be established simultaneously via radio resource control (RRC) signaling.

At 330, base station 305 may send an UL grant to UE 315 for a carrier in the unlicensed spectrum using cross carrier scheduling (i.e., the grant is sent via a carrier in licensed spectrum).

At 335, UE 315 may identify the source of the grant (e.g., that it received or will expect to receive grants via licensed spectrum). UE 315 may receive signaling indicative of a cross-carrier scheduling configuration and the carrier in the licensed spectrum may be identified based on the received signaling. In some examples, a preamble transmitted using resources indicated by the uplink grant is based on the source carrier for the uplink grant. Although FIG. 3A indicates that the UE 315 may identify the source of the grant after receiving the grant, in some cases, UE 315 may identify the source of the grant based on the configuration of carriers. For instance, if an SCC on unlicensed spectrum is configured as cross-carrier scheduled (e.g., cross-carrier controlled), UE 315 may identify the PCC as the source of UL grants for the carrier.

At 340, UE 315 may determine an LBT procedure (e.g., a length of a CCA) based on the source of the grant. That is, UE 315 may determine an LBT procedure for accessing a channel of a shared spectrum based on the source carrier for the uplink grant. For example, UE 315 may select a long CCA period based on the source carrier for the uplink grant.

In some examples, the CCA period includes a first duration if the source carrier is in a shared spectrum and the CCA period includes a second duration if the source carrier is in a licensed spectrum, such that the second duration is greater than the first duration. Thus, in some examples determining the LBT procedure includes determining a CCA procedure based on the source carrier for the uplink grant. In some cases, the determined CCA procedure includes a linear random or an exponential backoff procedure. UE 315 may select a second range parameter for the backoff procedure based on the source carrier being in a shared spectrum. The first range parameter for same carrier scheduling may be less than the second range parameter for cross-carrier scheduling. In some cases, determining the CCA procedure includes determining an LBT priority class for the exponential backoff procedure.

At 345, UE 315 may perform the LBT procedure (i.e., the CCA) using a long procedure based on the licensed spectrum used for sending the grant. At 350, may transmit an UL control or data message to base station 305 according to the UL grant.

FIG. 3B illustrates an example of a process flow 302 for uplink listen-before-talk operation using self-scheduling in accordance with various aspects of the present disclosure. Process flow 302 may include a UE 315 and base station 305, which may be examples of a UE and base station described with reference to FIGS. 1 and 2.

At 355, In some cases, UE 315 and base station 305 may establish a connection using licensed spectrum. In other cases, a connection in licensed spectrum is not established and all communications occur using shared or unlicensed spectrum. At 360, UE 315 and base station 305 may establish a connection using shared or unlicensed spectrum.

At 365, base station 305 may send an UL grant to UE 315 for a carrier in the unlicensed spectrum using same carrier scheduling (e.g., the grant is sent via the carrier in unlicensed spectrum).

At 370, UE 315 may identify the source of the grant (e.g., that it received via unlicensed spectrum). In some examples identifying the source carrier for the uplink grant includes identifying a carrier in the shared spectrum. In some examples, a preamble transmitted using resources indicated by the uplink grant is based on the source carrier for the uplink grant. In some examples, the source carrier includes a carrier in the shared spectrum and the preamble includes a WLAN preamble.

At 375, UE 315 may determine an LBT procedure (i.e., a length of a CCA) based on the source of the grant. That is, UE 315 may determine an LBT procedure for accessing a channel of a shared spectrum based on the source carrier for the uplink grant. For example, UE 315 may determine a CCA period based on the source carrier for the uplink grant.

In some examples the CCA period includes a first duration if the source carrier is in a shared spectrum and the CCA period includes a second duration if the source carrier is in a licensed spectrum, such that the second duration is greater than the first duration. In some examples the determined CCA procedure includes a CCA procedure without a backoff procedure. In some examples the determined CCA procedure includes a linear random or an exponential backoff procedure. The backoff length may depend on the source carrier of the grant.

In some examples, UE 315 may select a first range parameter for the backoff procedure if the source carrier is in a shared spectrum. In some examples a second range parameter for cross carrier scheduling is greater than the first range parameter. In some cases, UE 315 may determine that it is in a stand-alone operating mode. In some examples the source carrier is identified based on the determination.

At 380, UE 315 may perform the LBT procedure (i.e., the CCA) using a long procedure based on the licensed spectrum used for sending the grant. At 385, may transmit an UL control or data message to base station 305 according to the UL grant.

Figure 4:
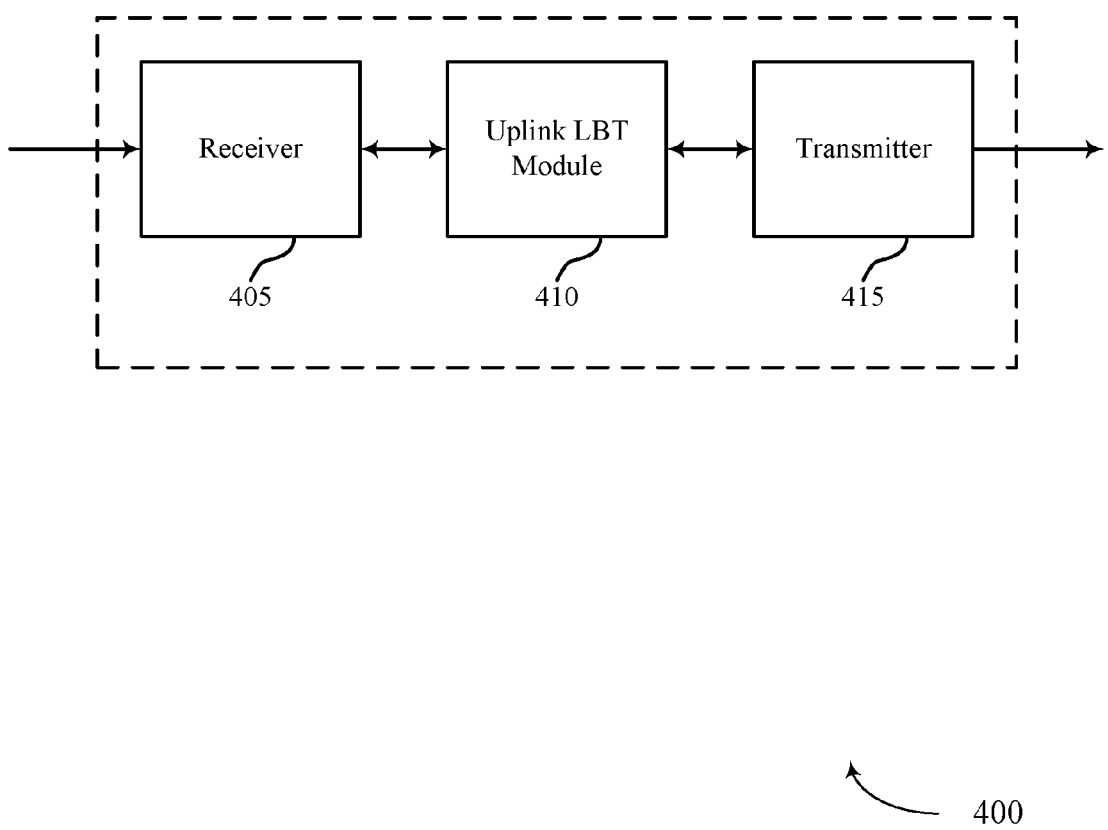
FIGS. 4-6 show block diagrams of a wireless device or devices that support uplink listen-before-talk operation in accordance with various aspects of the present disclosure.

FIG. 4 shows a block diagram of a wireless device 400 configured for uplink listen-before-talk operation in accordance with various aspects of the present disclosure. Wireless device 400 may be an example of aspects of a UE 115 described with reference to FIGS. 1-3. Wireless device 400 may include a receiver 405, an uplink LBT module 410, or a transmitter 415. Wireless device 400 may additionally or alternatively include a processor. Each of these components may be in communication with each other.

The receiver 405 may receive information such as packets, user data, or control information associated with various information channels (e.g., control channels, data channels, and information related to uplink listen-before-talk operation, etc.). Information may be passed on to the uplink LBT module 410, and to other components of wireless device 400.

The uplink LBT module 410 may identify a source carrier for an uplink grant, and determine an LBT procedure for accessing a channel of a shared spectrum based at least in part on the source carrier for the uplink grant.

The transmitter 415 may transmit signals received from other components of wireless device 400. In some examples, the transmitter 415 may be collocated with the receiver 405 in a transceiver module. The transmitter 415 may include a single antenna, or it may include a plurality of antennas.

Figure 5:
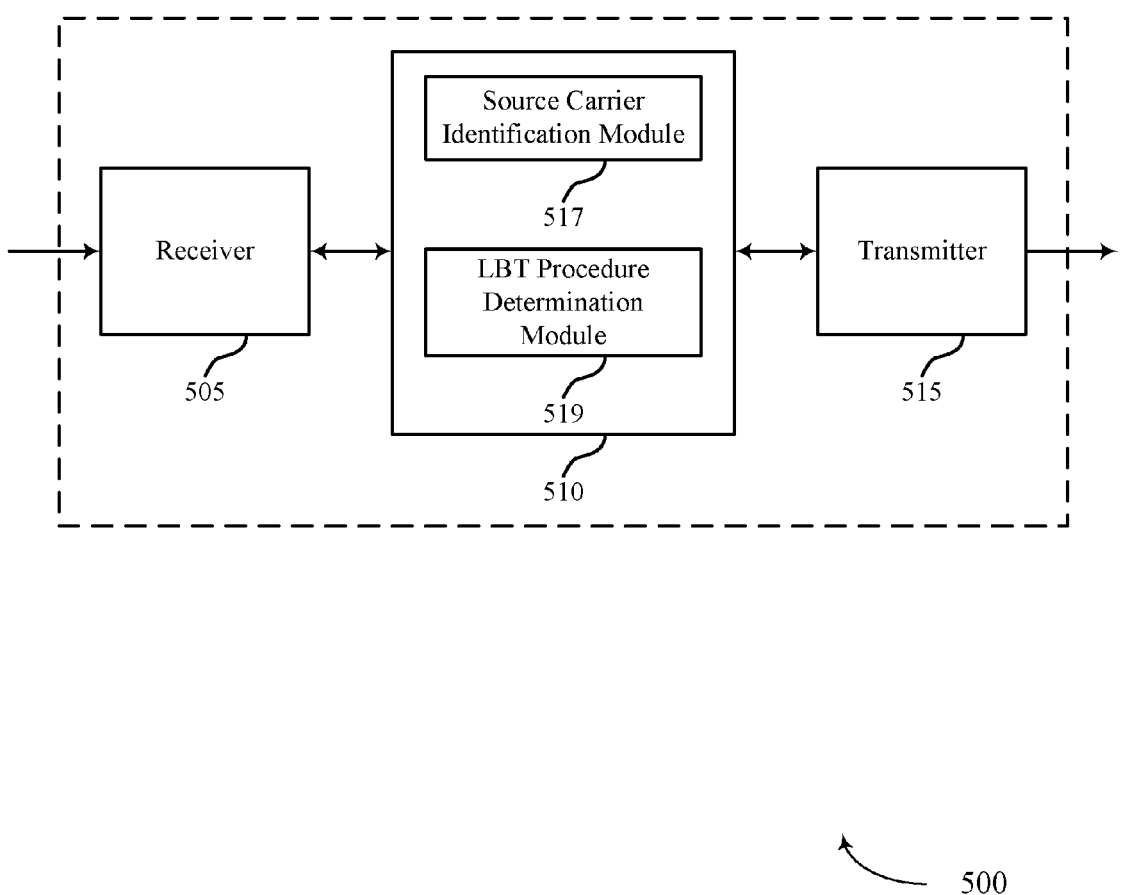

FIG. 5 shows a block diagram of a wireless device 500 for uplink listen-before-talk operation in accordance with various aspects of the present disclosure. Wireless device 500 may be an example of aspects of a wireless device 400 or a UE 115 described with reference to FIGS. 1-4. Wireless device 500 may include a receiver 505, an uplink LBT module 510, or a transmitter 515. Wireless device 500 may additionally or alternatively include a processor. Each of these components may be in communication with each other. The uplink LBT module 410 may additionally or alternatively include a source carrier identification module 517, and an LBT procedure determination module 519.

The receiver 405 may receive information which may be passed on to uplink LBT module 510, and to other components of wireless device 500. The uplink LBT module 410 may perform the operations described with reference to FIG. 4. The transmitter 415 may transmit signals received from other components of wireless device 500.

The source carrier identification module 517 may identify a source carrier for an uplink grant as described with reference to FIGS. 2-3.

The LBT procedure determination module 519 may determine an LBT procedure for accessing a channel of a shared spectrum based at least in part on the source carrier for the uplink grant as described with reference to FIGS. 2-3.

Figure 6:
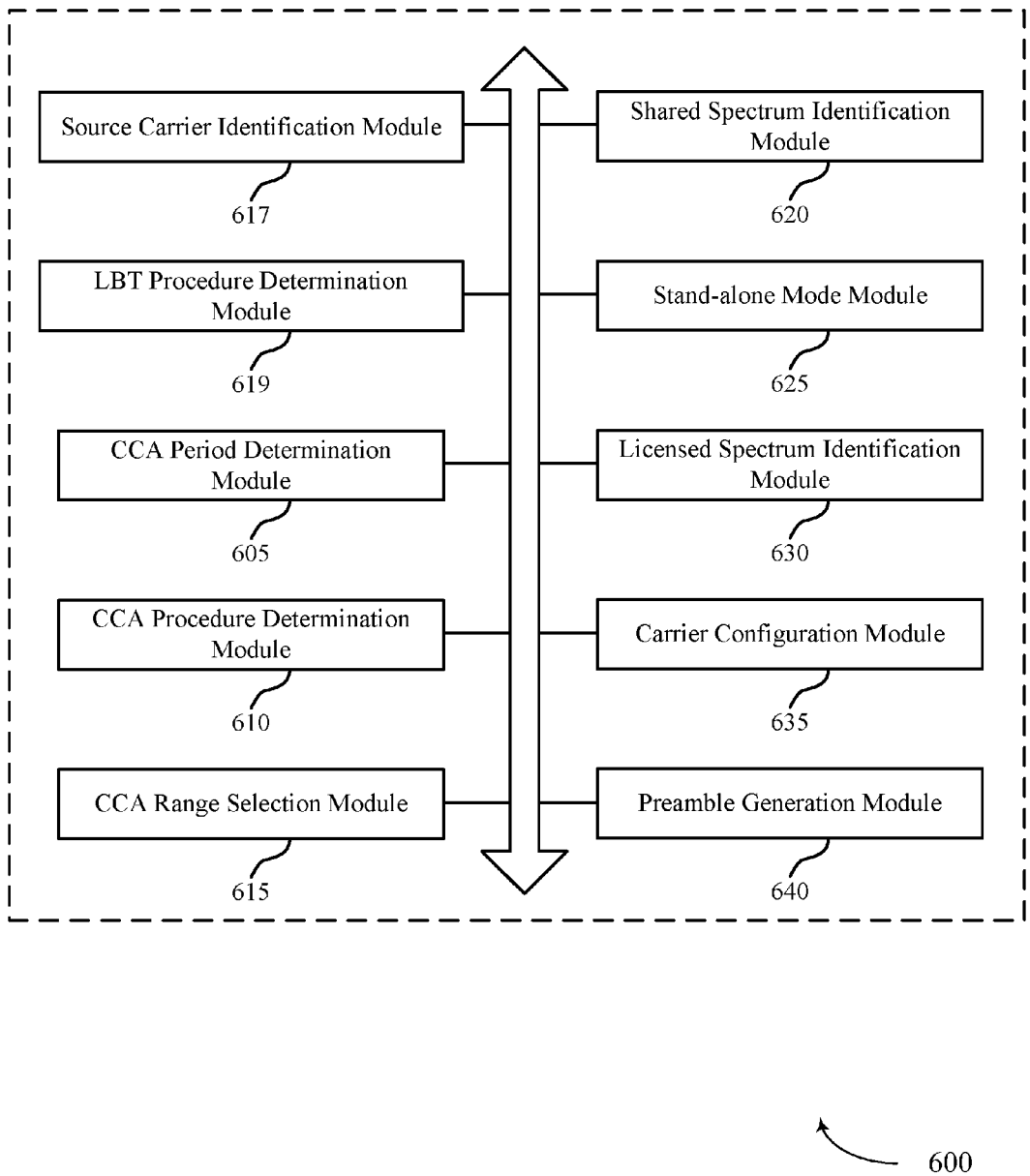

FIG. 6 shows a block diagram of an uplink LBT module 600 which may be a component of a wireless device 400 or a wireless device 500 for uplink listen-before-talk operation in accordance with various aspects of the present disclosure. The uplink LBT module 600 may be an example of aspects of an uplink LBT module 410 or 510 described with reference to FIGS. 4 and 5. The uplink LBT module 600 may include a source carrier identification module 617, and an LBT procedure determination module 619. Each of these modules may perform the functions described with reference to FIG. 5. The uplink LBT module 600 may additionally or alternatively include a CCA period determination module 605, a CCA procedure determination module 610, a CCA range selection module 615, a shared spectrum identification module 620, a stand-alone mode module 625, a licensed spectrum identification module 630, a carrier configuration module 635, and a preamble generation module 640.

The CCA period determination module 605 may determine the LBT procedure include determine a CCA period based at least in part on the source carrier for the uplink grant as described with reference to FIGS. 2, 3A, and 3B. In some examples, the CCA period includes a first duration if the source carrier may be in a shared spectrum and the CCA period includes a second duration if the source carrier may be in a licensed spectrum, such that the second duration may be greater than the first duration. In some examples, the determined CCA procedure includes a CCA procedure without a backoff procedure. In some examples, the determined CCA procedure includes a linear random or an exponential backoff procedure.

The CCA procedure determination module 610 may be configured such that determining the LBT procedure may include determine a CCA procedure based at least in part on the source carrier for the uplink grant as described with reference to FIGS. 2, 3A, and 3B.

The CCA range selection module 615 may select a first range parameter for the backoff procedure if the source carrier is in a shared spectrum as described with reference to FIGS. 2-3. The CCA range selection module 615 may additionally or alternatively select a second range parameter for the backoff procedure if the source carrier is in a licensed spectrum. In some examples, the second range parameter may be greater than the first range parameter.

The shared spectrum identification module 620 may be configured such that identifying the source carrier for the uplink grant may include identifying a carrier in the shared spectrum as described with reference to FIGS. 2, 3A, and 3B. In some examples, the source carrier may be identified based at least in part on the determination that the UE 115 may be in the stand-alone operating mode.

The stand-alone mode module 625 may determine that a UE is in a stand-alone operating mode as described with reference to FIGS. 2, 3A, and 3B.

The licensed spectrum identification module 630 may be configured such that identifying the source carrier for the uplink grant may include identifying a carrier in a licensed spectrum, such that the uplink grant may be cross-carrier controlled by the identified carrier as described with reference to FIGS. 2, 3A, and 3B. In some examples, the carrier in the licensed spectrum may be identified based at least in part on the received signaling.

The carrier configuration module 635 may receive signaling indicative of a cross-carrier scheduling configuration as described with reference to FIGS. 2, 3A, and 3B.

The preamble generation module 640 may be configured such that a preamble transmitted using resources indicated by the uplink grant may be based at least in part on the source carrier for the uplink grant as described with reference to FIGS. 2, 3A, and 3B. In some examples, the source carrier includes a carrier in the shared spectrum and the preamble includes a WLAN preamble.

Figure 7:
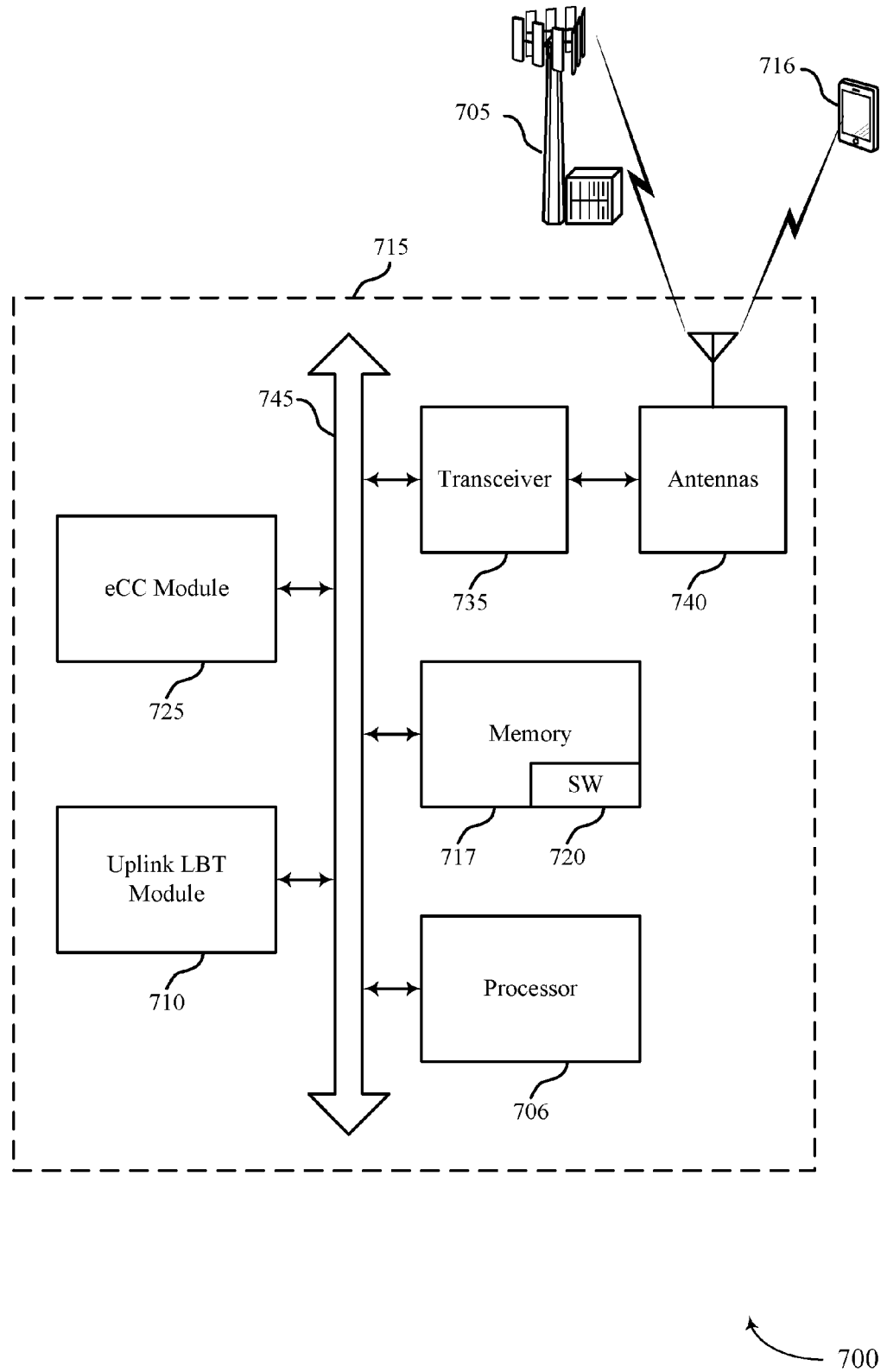
FIG. 7 illustrates a block diagram of a system, including a UE, that supports uplink listen-before-talk operation in accordance with various aspects of the present disclosure.

FIG. 7 shows a diagram of a system 700 including a UE 715 configured for uplink listen-before-talk operation in accordance with various aspects of the present disclosure. System 700 may include UE 715, which may be an example of a wireless device 400, a wireless device 500, or a UE 115 described with reference to FIGS. 1, 2-6. UE 715 may include an uplink LBT module 710, which may be an example of an uplink LBT module 410, 510, or 600 described with reference to FIGS. 4-6. UE 715 may additionally or alternatively include an eCC module 725. UE 715 may additionally or alternatively include components for bi-directional voice and data communications including components for transmitting communications and components for receiving communications. For example, UE 715 may communicate bi-directionally with base station 705 or UE 716.

The eCC Module 725 may facilitate communication on a carrier that utilizes unlicensed or shared spectrum. For example, the eCC module 725 may provide for operations related to an eCC as described with reference to FIG. 1. In some cases, eCC module 725 facilitates a stand-alone mode for UE 715.

UE 715 may additionally or alternatively include a processor 706, and memory 717 (including software (SW) 720), a transceiver 735, and one or more antenna(s) 740, each of which may communicate, directly or indirectly, with one another (e.g., via buses 745). The transceiver 735 may communicate bi-directionally, via the antenna(s) 740 or wired or wireless links, with one or more networks, as described above. For example, the transceiver 735 may communicate bi-directionally with a base station 705 or another UE 716. The transceiver 735 may include a modem to modulate the packets and provide the modulated packets to the antenna(s) 740 for transmission, and to demodulate packets received from the antenna(s) 740. While UE 715 may include a single antenna 740, UE 715 may additionally or alternatively have multiple antennas 740 capable of concurrently transmitting or receiving multiple wireless transmissions.

The memory 717 may include random access memory (RAM) and read only memory (ROM). The memory 717 may store computer-readable, computer-executable software/firmware code 720 including instructions that, when executed, cause the processor 706 to perform various functions described herein (e.g., uplink listen-before-talk operation, etc.). Alternatively, the software/firmware code 720 may not be directly executable by the processor 706 but cause a computer (e.g., when compiled and executed) to perform functions described herein. The processor 706 may include an intelligent hardware device, (e.g., a central processing unit (CPU), a microcontroller, an application specific integrated circuit (ASIC), etc.)

Figure 8:
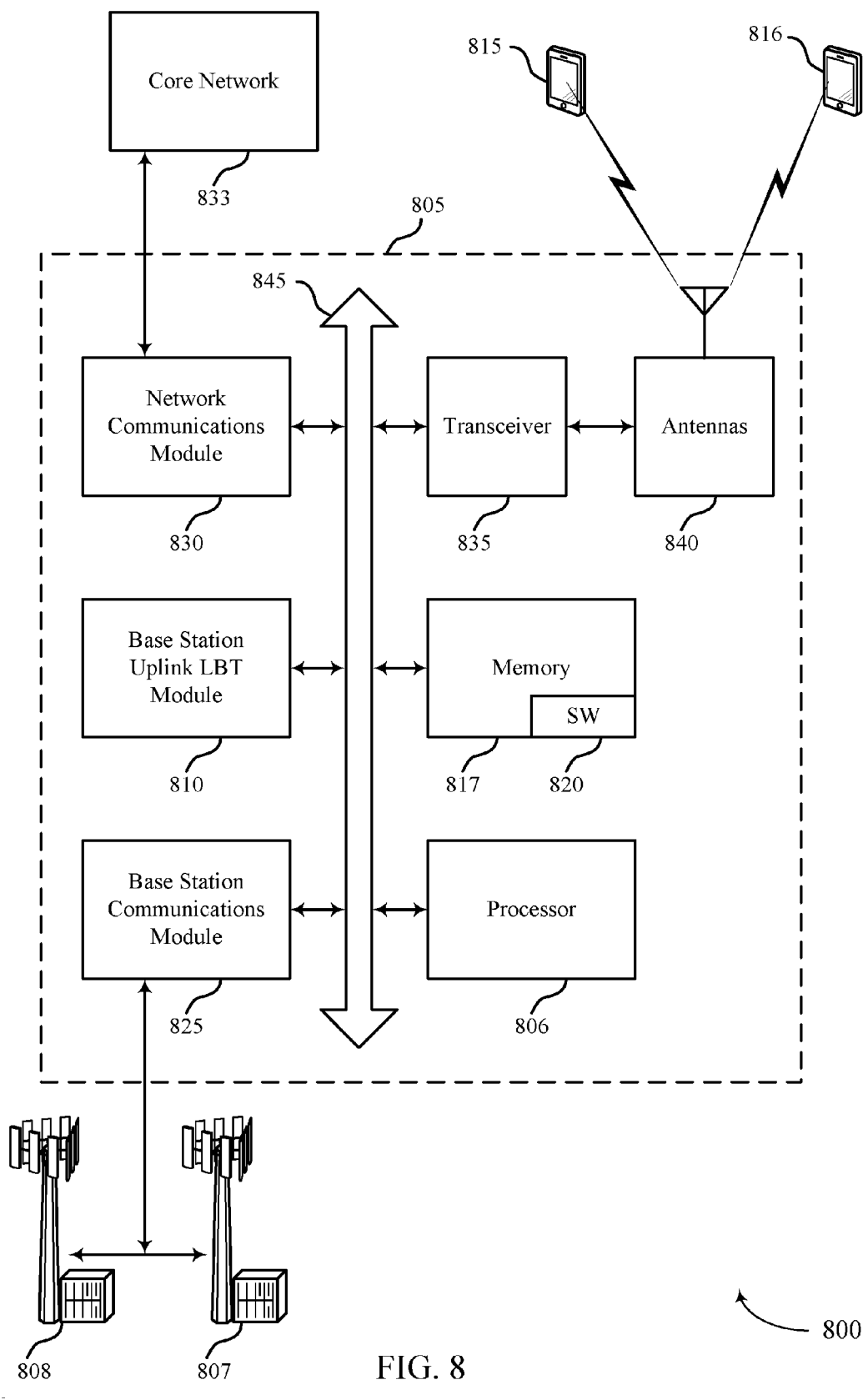
FIG. 8 illustrates a block diagram of a system, including a base station, that supports uplink listen-before-talk operation in accordance with various aspects of the present disclosure.

FIG. 8 shows a diagram of a system 800 including a base station 805 configured for uplink listen-before-talk operation in accordance with various aspects of the present disclosure. System 800 may include base station 805, which may be an example of a wireless device 400, a wireless device 500, or a base station 105 described with reference to FIGS. 1-7. Base Station 805 may include a base station uplink LBT module 810, which may be an example of an uplink LBT module 410, 510, or 600 described with reference to FIGS. 4-6. Base Station 805 may additionally or alternatively include components for bi-directional voice and data communications including components for transmitting communications and components for receiving communications. For example, base station 705 may communicate bi-directionally with base station 807 or base station 808

In some cases, base station 805 may have one or more wired backhaul links. Base station 805 may have a wired backhaul link (e.g., S1 interface, etc.) to the core network 833. Base station 805 may additionally or alternatively communicate with other base stations, such as base station 807 and base station 808 via inter-base station backhaul links (e.g., an X2 interface). Each of the base stations may communicate with UEs using the same or different wireless communications technologies. In some cases, base station 805 may communicate with other base stations such as 807 or 808 utilizing base station communications module 825. In some examples, base station communications module 825 may provide an X2 interface within an LTE/LTE-A wireless communication network technology to provide communication between some of the base stations. In some examples, base station 805 may communicate with other base stations through core network 833. In some cases, base station 805 may communicate with the core network 833 through network communications module 830.

The base station 805 may include a processor 806, memory 817 (including software (SW) 820), transceiver 835, and antenna(s) 840, which each may be in communication, directly or indirectly, with one another (e.g., over bus system 845). The transceivers 835 may be configured to communicate bi-directionally, via the antenna(s) 840, with the UEs 815 and 816, which may be multi-mode devices. The transceiver 835 (or other components of the base station 805) may additionally or alternatively be configured to communicate bi-directionally, via the antennas 840, with one or more other base stations (not shown). The transceiver 835 may include a modem configured to modulate the packets and provide the modulated packets to the antennas 840 for transmission, and to demodulate packets received from the antennas 840. The base station 805 may include multiple transceivers 835, each with one or more associated antennas 840. The transceiver may be an example of a combined receiver 405 and transmitter 415 of FIG. 4.

The memory 817 may include RAM and ROM. The memory 817 may additionally or alternatively store computer-readable, computer-executable software code 820 containing instructions that are configured to, when executed, cause the processor 806 to perform various functions described herein (e.g., uplink listen-before-talk operation, selecting coverage enhancement techniques, call processing, database management, message routing, etc.). Alternatively, the software code 820 may not be directly executable by the processor 806 but be configured to cause the computer, e.g., when compiled and executed, to perform functions described herein. The processor 806 may include an intelligent hardware device, e.g., a CPU, a microcontroller, an ASIC, etc. The processor 806 may include various special purpose processors such as encoders, queue processing modules, base band processors, radio head controllers, digital signal processor (DSPs), and the like.

The base station communications module 825 may manage communications with other base stations. In some cases, a communications management module may include a controller or scheduler for controlling communications with UEs in cooperation with other base stations. For example, the base station communications module 825 may coordinate scheduling for transmissions to UEs for various interference mitigation techniques such as beamforming or joint transmission.

The components of wireless device 400, wireless device 500, and uplink LBT module 600, the UE 715, and base station 805 may each, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may additionally or alternatively be implemented, in whole or in part, with instructions embodied in a memory, formatted to be executed by one or more general or application-specific processors.

Figure 9:
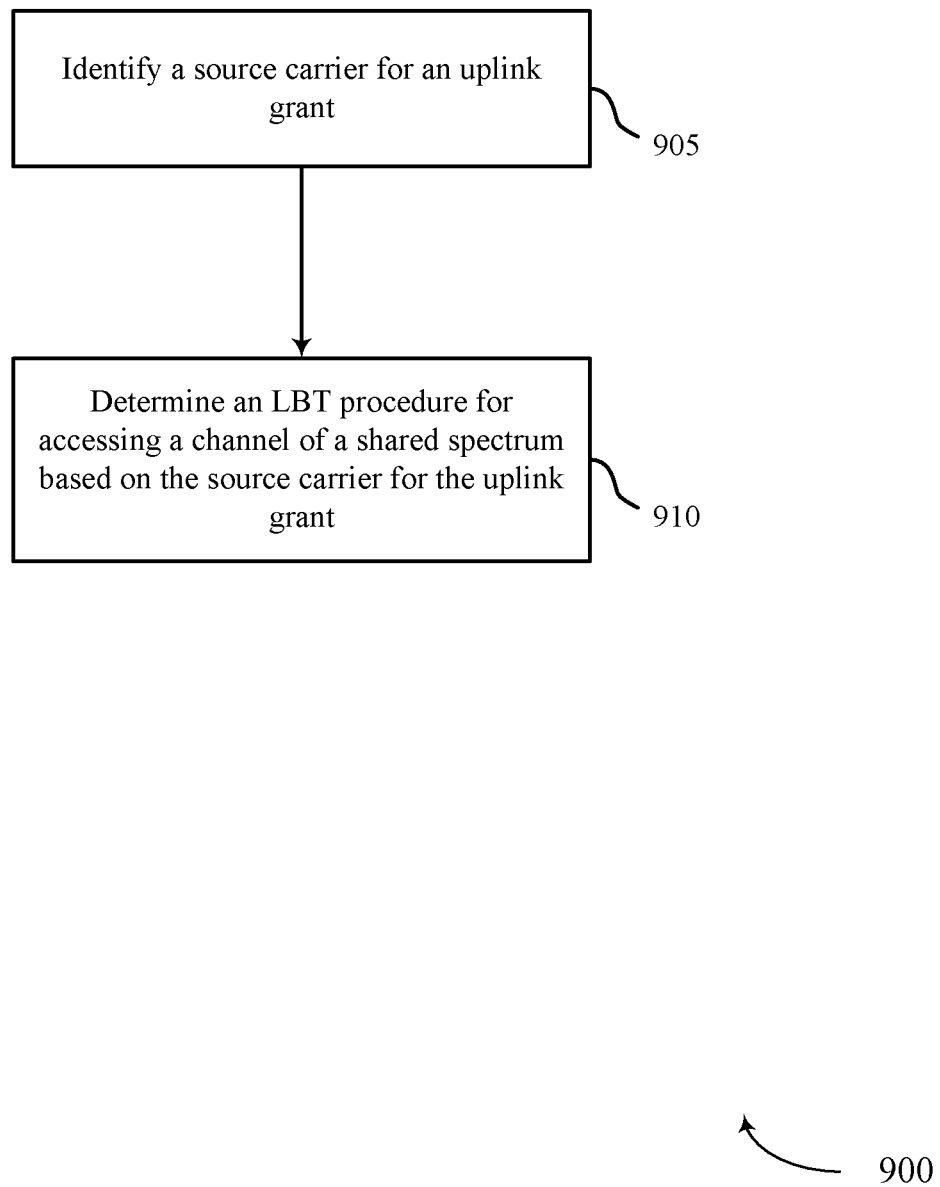
FIGS. 9-14 illustrate methods for uplink listen-before-talk operation in accordance with various aspects of the present disclosure.

FIG. 9 shows a flowchart illustrating a method 900 for uplink listen-before-talk operation in accordance with various aspects of the present disclosure. The operations of method 900 may be implemented by a UE 115 or base station 105, or various components of a UE 115 or base station, as described with reference to FIGS. 1-8. For example, the operations of method 900 may be performed by the uplink LBT module 410, 510, or 600 as described with reference to FIGS. 4-6. In some examples, a UE 115 or base station 105 may execute a set of codes to control the functional elements of the UE 115 or base station to perform the functions described below. Additionally or alternatively, the UE 115 or base station 105 may perform aspects the functions described below using special-purpose hardware.

At block 905, the UE 115 or base station 105 may identify a source carrier for an uplink grant as described with reference to FIG. 2, 3A, or 3B3. In some examples, the operations of block 905 may be performed by the source carrier identification module 517 as described with reference to FIG. 5.

At block 910, the UE 115 or base station 105 may determine an LBT procedure for accessing a channel of a shared spectrum part on the source carrier for the uplink grant as described with reference to FIG. 2, 3A, or 3B. In some examples, the operations of block 910 may be performed by the LBT procedure determination module 519 as described with reference to FIG. 5.

Figure 10:
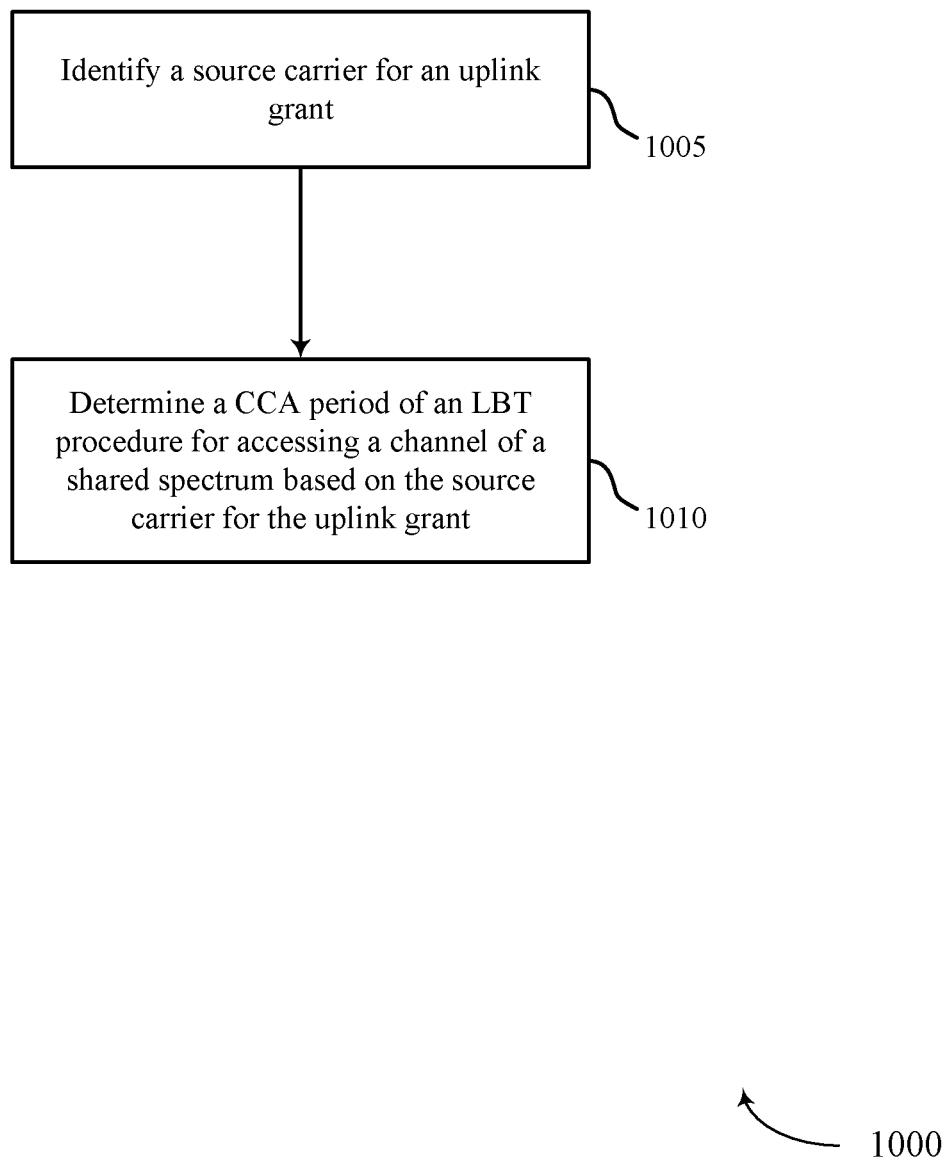

FIG. 10 shows a flowchart illustrating a method 1000 for uplink listen-before-talk operation in accordance with various aspects of the present disclosure. The operations of method 1000 may be implemented by a UE 115 or its components as described with reference to FIGS. 1-8. For example, the operations of method 1000 may be performed by the uplink LBT module 410, 510, or 600 as described with reference to FIGS. 4-6. In some examples, a UE 115 may execute a set of codes to control the functional elements of the UE 115 to perform the functions described below. Additionally or alternatively, the UE 115 may perform aspects the functions described below using special-purpose hardware. The method 1000 may additionally or alternatively incorporate aspects of method 900 of FIG. 9.

At block 1005, the UE 115 may identify a source carrier for an uplink grant as described with reference to FIG. 2, 3A, or 3B. In some examples, the operations of block 1005 may be performed by the source carrier identification module 517 as described with reference to FIG. 5.

At block 1010, the UE 115 may determine an LBT procedure for accessing a channel of a shared spectrum based on the source carrier for the uplink grant as described with reference to FIG. 2, 3A, or 3B. Determining the LBT procedure may include determining a CCA period based on the source carrier for the uplink grant as described with reference to FIG. 2, 3A, or 3B. In some examples, the operations of block 1010 may be performed by the CCA period determination module 605 as described with reference to FIG. 6.

Figure 11:
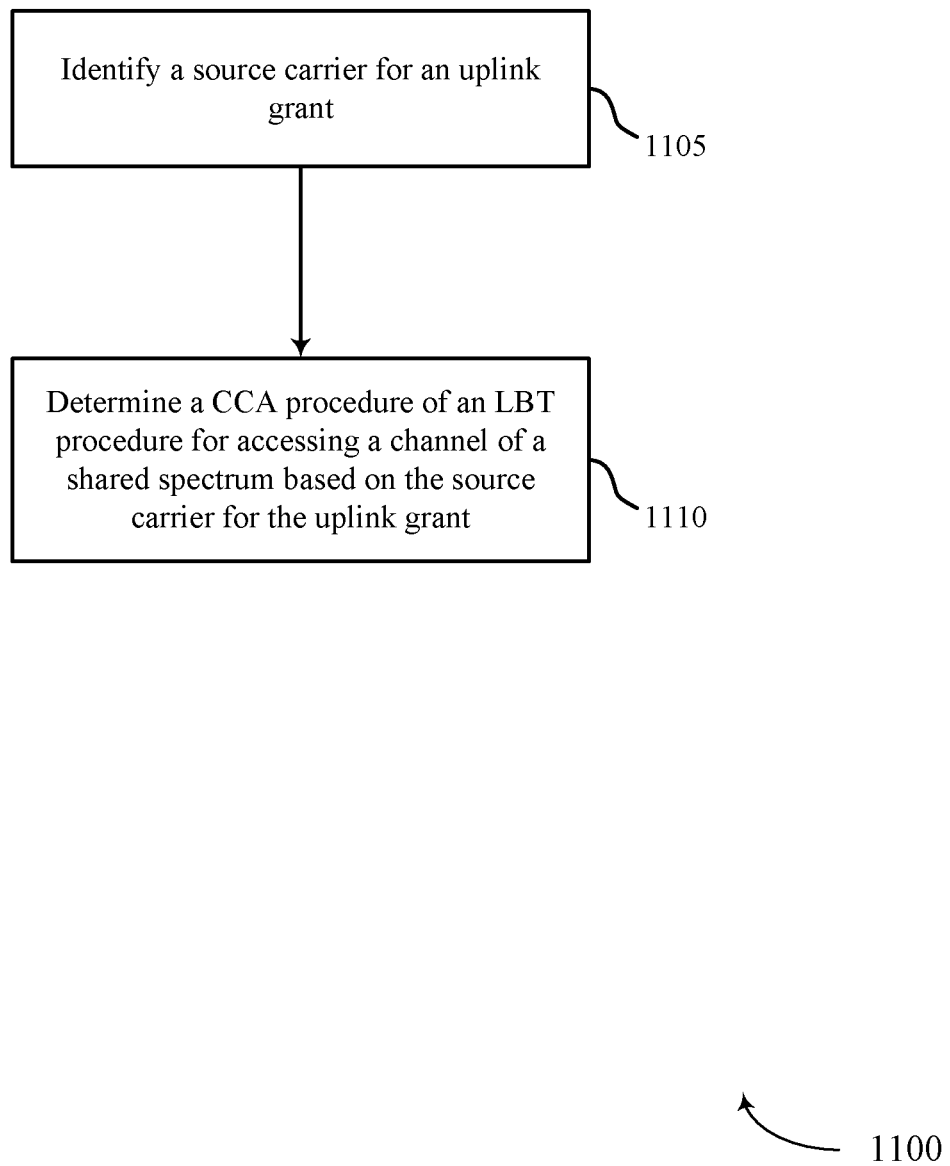

FIG. 11 shows a flowchart illustrating a method 1100 for uplink listen-before-talk operation in accordance with various aspects of the present disclosure. The operations of method 1100 may be implemented by a UE 115 or its components as described with reference to FIGS. 1-8. For example, the operations of method 1100 may be performed by the uplink LBT module 410, 510, or 600 as described with reference to FIGS. 4-6. In some examples, a UE 115 may execute a set of codes to control the functional elements of the UE 115 to perform the functions described below. Additionally or alternatively, the UE 115 may perform aspects the functions described below using special-purpose hardware. The method 1100 may additionally or alternatively incorporate aspects of methods 900 or 1000 of FIGS. 9 and 10.

At block 1105, the UE 115 may identify a source carrier for an uplink grant as described with reference to FIGS. 2-3. In some examples, the operations of block 1105 may be performed by the source carrier identification module 517 as described with reference to FIG. 5.

At block 1110, the UE 115 may determine an LBT procedure for accessing a channel of a shared spectrum based at least in part on the source carrier for the uplink grant as described with reference to FIG. 2, 3A, or 3B. Determining the LBT procedure may include determining a CCA procedure based on the source carrier for the uplink grant as described with reference to FIG. 2, 3A, or 3B. In some examples, the operations of block 1010 may be performed by the CCA procedure determination module 610 as described with reference to FIG. 6.

Figure 12:
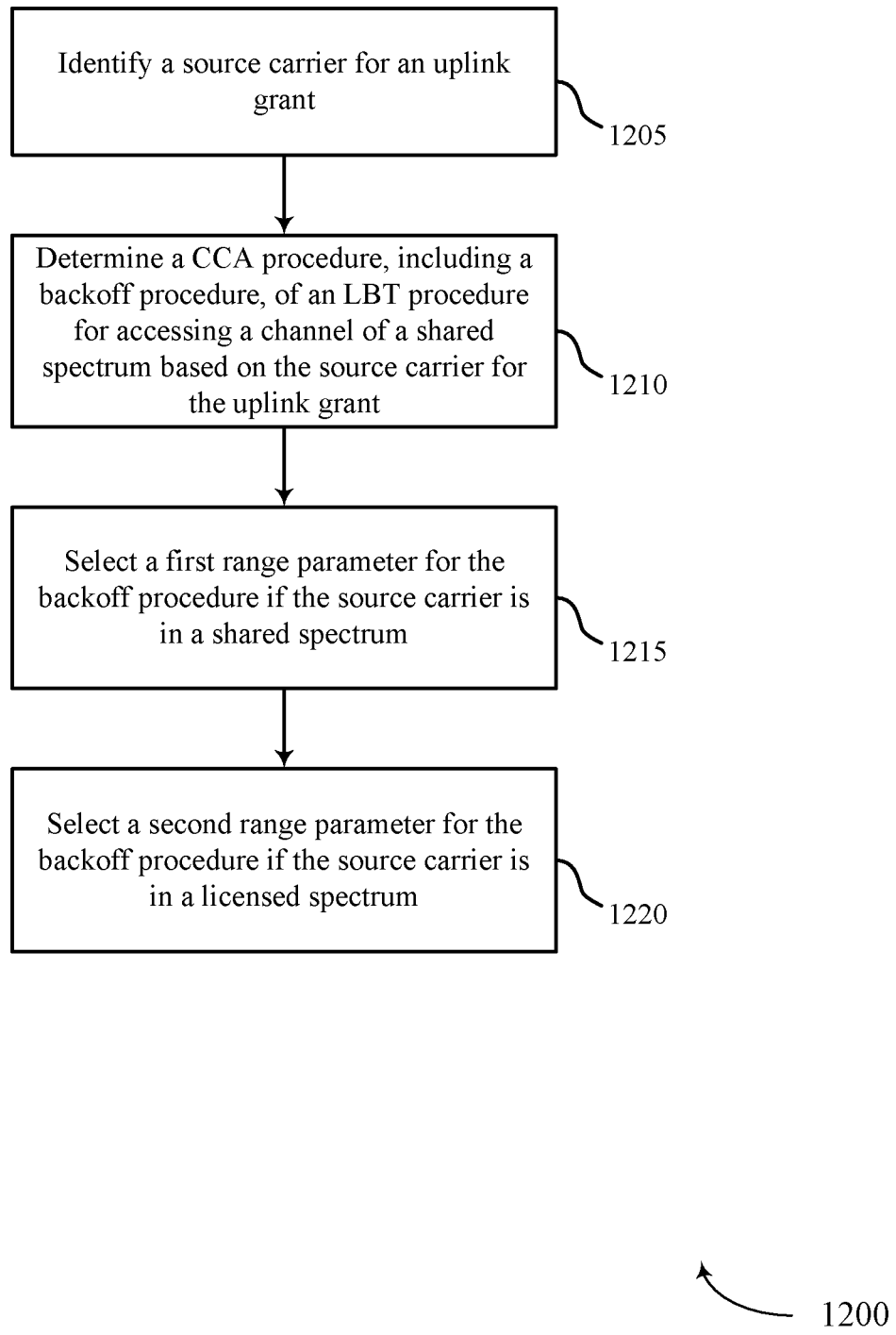

FIG. 12 shows a flowchart illustrating a method 1200 for uplink listen-before-talk operation in accordance with various aspects of the present disclosure. The operations of method 1200 may be implemented by a UE 115 or its components as described with reference to FIGS. 1-8. For example, the operations of method 1200 may be performed by the uplink LBT module 410, 510, or 600 as described with reference to FIGS. 4-6. In some examples, a UE 115 may execute a set of codes to control the functional elements of the UE 115 to perform the functions described below. Additionally or alternatively, the UE 115 may perform aspects the functions described below using special-purpose hardware. The method 1200 may additionally or alternatively incorporate aspects of methods 900, 1000, or 1100 of FIGS. 9-11.

At block 1205, the UE 115 may identify a source carrier for an uplink grant as described with reference to FIGS. 2-3. In some examples, the operations of block 1205 may be performed by the source carrier identification module 517 as described with reference to FIG. 5.

At block 1210, the UE 115 may determine an LBT procedure for accessing a channel of a shared spectrum based at least in part on the source carrier for the uplink grant as described with reference to FIGS. 2-3. In some examples, the operations of block 1210 may be performed by the LBT procedure determination module 519 as described with reference to FIG. 5. In some cases, the determined CCA procedure includes a linear random or an exponential backoff procedure.

At block 1215, the UE 115 may select a first range parameter for the backoff procedure if the source carrier is in a shared spectrum as described with reference to FIG. 2, 3A, or 3B. In some examples, the operations of block 1215 may be performed by the CCA range selection module 615 as described with reference to FIG. 6.

At block 1220, the UE 115 may select a second range parameter for the backoff procedure if the source carrier is in a licensed spectrum as described with reference to FIG. 2, 3A, or 3B-3. In some examples, the operations of block 1220 may be performed by the CCA range selection module 615 as described with reference to FIG. 6. In some cases, the second range parameter is greater than the first range parameter.

Figure 13:
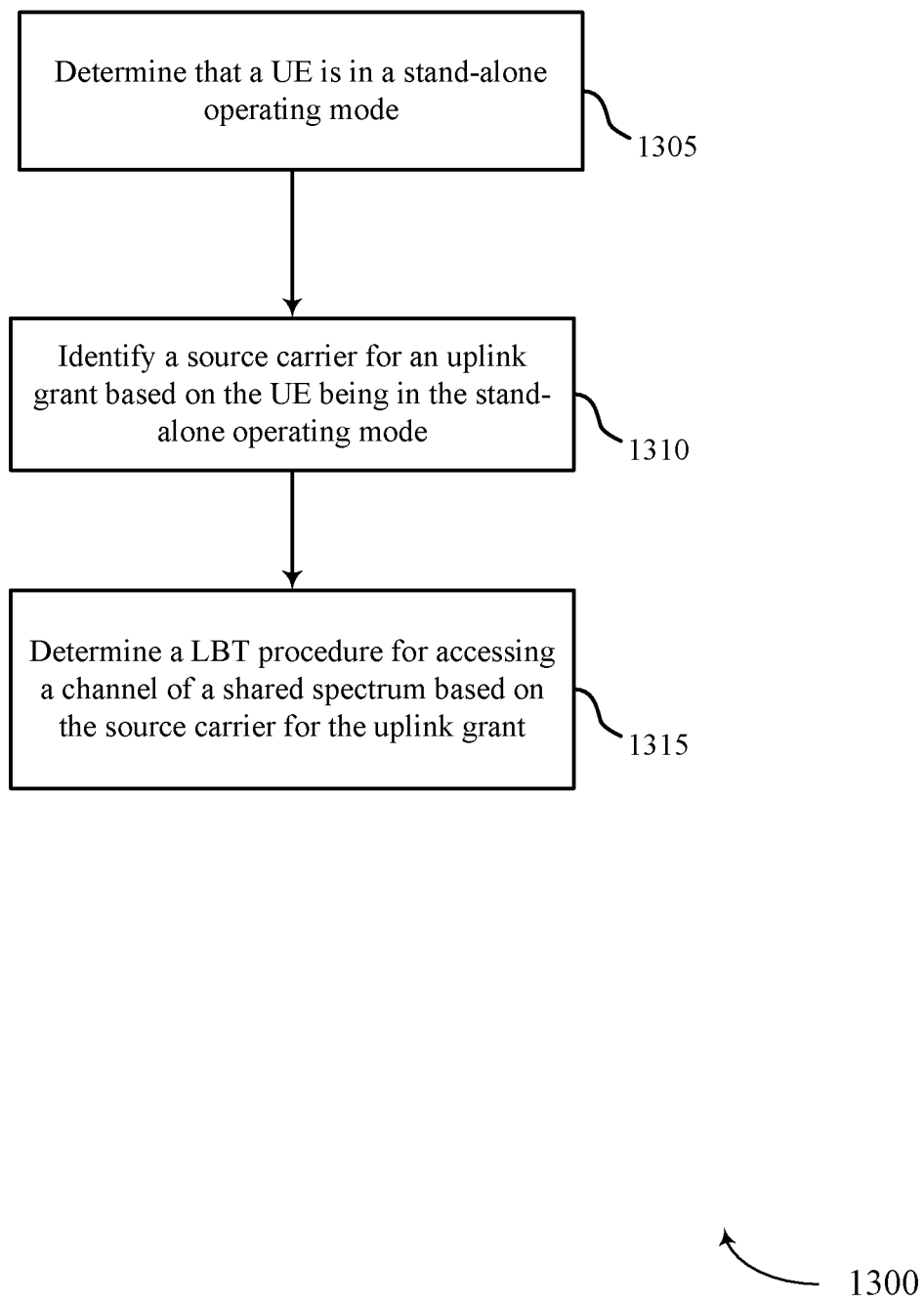

FIG. 13 shows a flowchart illustrating a method 1300 for uplink listen-before-talk operation in accordance with various aspects of the present disclosure. The operations of method 1300 may be implemented by a UE 115 or its components as described with reference to FIGS. 1-8. For example, the operations of method 1300 may be performed by the uplink LBT module 410, 510, or 600 as described with reference to FIGS. 4-6. In some examples, a UE 115 may execute a set of codes to control the functional elements of the UE 115 to perform the functions described below. Additionally or alternatively, the UE 115 may perform aspects the functions described below using special-purpose hardware. The method 1300 may additionally or alternatively incorporate aspects of methods 900, 1000, 1100, or 1200 of FIGS. 9-12.

At block 1305, the UE 115 may determine that it is in a stand-alone operating mode as described with reference to FIG. 2, 3A, or 3B. In some examples, the operations of block 1315 may be performed by the stand-alone mode module 625 as described with reference to FIG. 6.

At block 1310, the UE 115 may identify a source carrier for an uplink grant based on the UE 115 being in the stand-alone operation mode, and the identified carrier may be a shared spectrum carrier, as described with reference to FIG. 2, 3A, or 3B. In some examples, the operations of block 1305 may be performed by the source carrier identification module 517 as described with reference to FIG. 5.

At block 1315, the UE 115 may determine an LBT procedure for accessing a channel of a shared spectrum based on the source carrier for the uplink grant as described with reference to FIG. 2, 3A, or 3B. In some examples, the operations of block 1310 may be performed by the LBT procedure determination module 519 as described with reference to FIG. 5.

Figure 14:
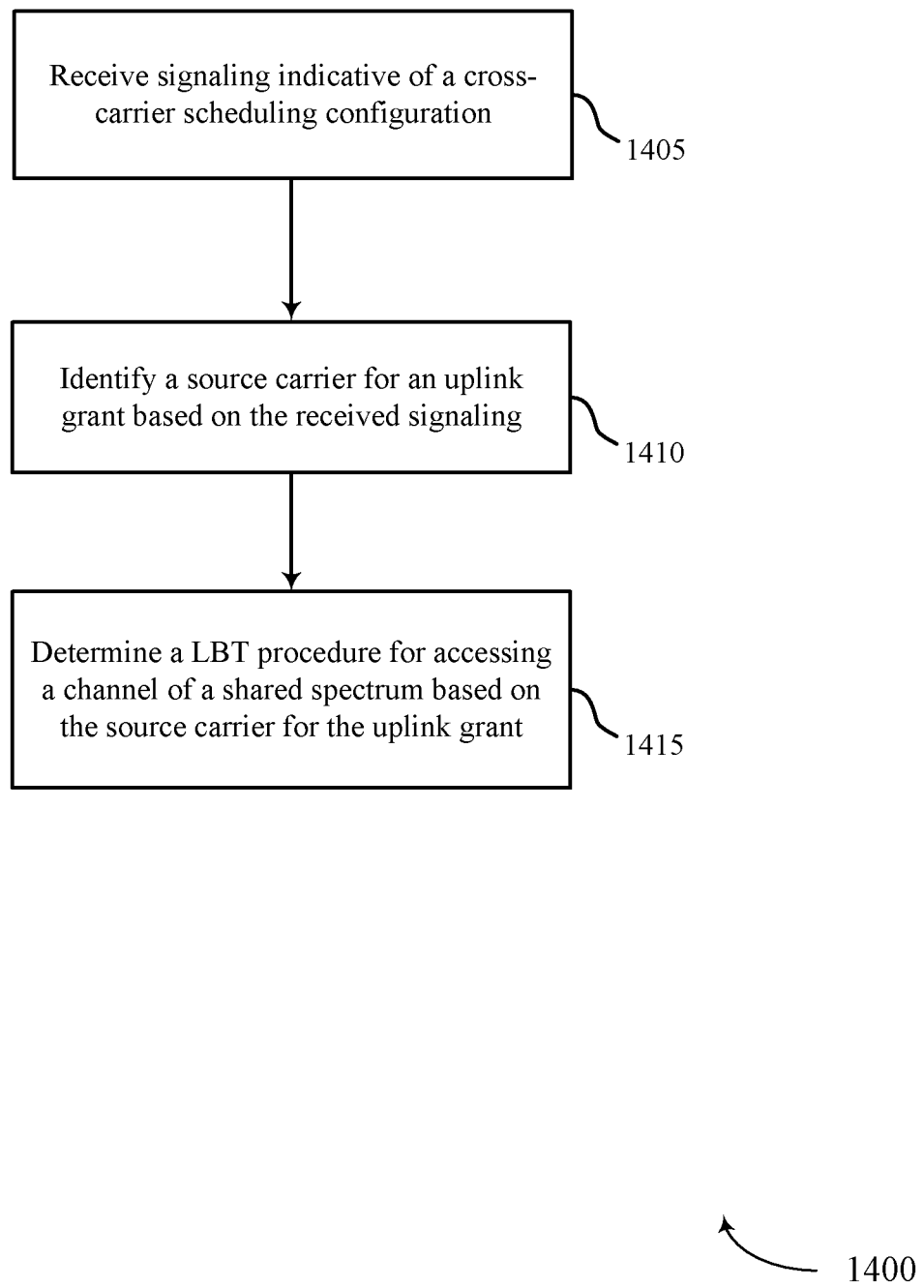

FIG. 14 shows a flowchart illustrating a method 1400 for uplink listen-before-talk operation in accordance with various aspects of the present disclosure. The operations of method 1400 may be implemented by a UE 115 or its components as described with reference to FIGS. 1-8. For example, the operations of method 1400 may be performed by the uplink LBT module 410, 510, or 600 as described with reference to FIGS. 4-6. In some examples, a UE 115 may execute a set of codes to control the functional elements of the UE 115 to perform the functions described below. Additionally or alternatively, the UE 115 may perform aspects the functions described below using special-purpose hardware. The method 1400 may additionally or alternatively incorporate aspects of methods 900, 1000, 1100, 1200, and 1300 of FIGS. 9-13.

At block 1415, the UE 115 may receive signaling indicative of a cross-carrier scheduling configuration as described with reference to FIG. 2, 3A, or 3B-3. In some examples, the operations of block 1415 may be performed by the carrier configuration module 635 as described with reference to FIG. 6.

At block 1410, the UE 115 may identify a source carrier for an uplink grant based on the received signals, and the identified source carrier may be a licensed spectrum carrier, as described with reference to FIG. 2, 3A, or 3B. In some examples, the operations of block 1405 may be performed by the source carrier identification module 517 as described with reference to FIG. 5.

At block 1415, the UE 115 may determine an LBT procedure for accessing a channel of a shared spectrum based on the source carrier for the uplink grant as described with reference to FIG. 2, 3A, or 3B-3. In some examples, the operations of block 1410 may be performed by the LBT procedure determination module 519 as described with reference to FIG. 5.

Thus, methods 900, 1000, 1100, 1200, 1300, and 1400 may provide for uplink listen-before-talk operation. It should be noted that methods 900, 1000, 1100, 1200, 1300, and 1400 describe possible implementation, and that the operations and the steps may be rearranged or otherwise modified such that other implementations are possible. In some examples, aspects from two or more of the methods 900, 1000, 1100, 1200, 1300, and 1400 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Additional or alternatively, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, Universal Mobile Telecommunications System (UMTS), LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE networks, including such networks described herein, the term evolved node B (eNB) may be, for example, used to describe the base stations. The wireless communications system or systems described herein may include a heterogeneous LTE/LTE network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell, for example, may cover a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may additionally or alternatively cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may additionally or alternatively be called forward link transmissions while the uplink transmissions may additionally or alternatively be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Additionally or alternatively, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may additionally or alternatively be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Additionally or alternatively, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are additionally or alternatively included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:
1. A method for wireless communications, comprising:
   identifying a source carrier for an uplink grant;
   determining a listen-before-talk (LBT) procedure for accessing a channel of a shared spectrum based at least in part on the source carrier for the uplink grant; and selecting a period for the LBT procedure based at least in part on whether the source carrier is in a shared spectrum or in a licensed spectrum,
wherein the period of the LBT procedure comprises a first duration if the source carrier is in the shared spectrum and a second duration greater than the first duration if the source carrier is in the licensed spectrum.

2. The method of claim 1, wherein determining the LBT procedure comprises:
determining a clear channel assessment (CCA) period based at least in part on the source carrier for the uplink grant.

3. The method of claim 2, wherein the CCA period comprises a third duration if the source carrier is in the shared spectrum and the CCA period comprises a fourth duration if the source carrier is in the licensed spectrum, wherein the fourth duration is greater than the third duration.

4. The method of claim 1, wherein determining the LBT procedure comprises:
determining a CCA procedure based at least in part on the source carrier for the uplink grant.

5. The method of claim 4, wherein the determined CCA procedure comprises a CCA procedure without a backoff procedure.

6. The method of claim 4, wherein the determined CCA procedure comprises a linear random or an exponential backoff procedure.

7. The method of claim 6, wherein the determined CCA procedure further comprises:
determining an LBT priority class for the exponential backoff procedure.

8. The method of claim 6, further comprising:
selecting a first range parameter for the backoff procedure if the source carrier is in the shared spectrum; and
selecting a second range parameter for the backoff procedure if the source carrier is in the licensed spectrum, wherein the second range parameter is greater than the first range parameter, wherein the first range parameter and the second range parameter are different from a range parameter associated with a base station from which the uplink grant is received.

9. The method of claim 1, wherein identifying the source carrier for the uplink grant comprises:
identifying a carrier in the shared spectrum.

10. The method of claim 9, further comprising:
determining that a user equipment (UE) is in a stand-alone operating mode, wherein the source carrier is identified based at least in part on the determination that the UE is in the stand-alone operating mode.

11. The method of claim 1, wherein identifying the source carrier for the uplink grant comprises:
identifying a carrier in the licensed spectrum, wherein the uplink grant is cross-carrier controlled by the identified carrier.

12. The method of claim 11, further comprising:
receiving signaling indicative of a cross-carrier scheduling configuration, wherein the carrier in the licensed spectrum is identified based at least in part on the received signaling.

13. The method of claim 1, wherein a preamble transmitted using resources indicated by the uplink grant is based at least in part on the source carrier for the uplink grant.

14. The method of claim 13, wherein the source carrier comprises a carrier in the shared spectrum and the preamble comprises a wireless local area network (WLAN) preamble.

15. An apparatus for wireless communications, comprising:

means for identifying a source carrier for an uplink grant;
means for determining a listen-before-talk (LBT) procedure for accessing a channel of a shared spectrum based at least in part on the source carrier for the uplink grant; and
means for selecting a period for the LBT procedure based at least in part on whether the source carrier is in a shared spectrum or in a licensed spectrum,
wherein the period of the LBT procedure comprises a first duration if the source carrier is in the shared spectrum and a second duration greater than the first duration if the source carrier is in the licensed spectrum.

16. The apparatus of claim 15, wherein the means for determining the LBT procedure comprises:
means for determining a CCA period based at least in part on the source carrier for the uplink grant.

17. The apparatus of claim 16, wherein the CCA period comprises a third duration if the source carrier is in the shared spectrum and the CCA period comprises a fourth duration if the source carrier is in the licensed spectrum, wherein the fourth duration is greater than the third duration.

18. The apparatus of claim 15, wherein the means for determining the LBT procedure comprises:
means for determining a CCA procedure based at least in part on the source carrier for the uplink grant.

19. The apparatus of claim 18, wherein the means for determining the CCA procedure are operable to determine a CCA procedure without a backoff procedure.

20. The apparatus of claim 18, wherein the means for determining the CCA procedure are operable to determine a linear random or an exponential backoff procedure.

21. The apparatus of claim 20, wherein the means for determining the LBT procedure further comprises:
means for determining an LBT priority class for the exponential backoff procedure.

22. The apparatus of claim 20, further comprising:
means for selecting a first range parameter for the backoff procedure if the source carrier is in the shared spectrum; and
means for selecting a second range parameter for the backoff procedure if the source carrier is in the licensed spectrum, wherein the second range parameter is greater than the first range parameter, wherein the first range parameter and the second range parameter are different from a range parameter associated with a base station from which the uplink grant is received.

23. The apparatus of claim 15, wherein the means for identifying the source carrier for the uplink grant comprises:
means for identifying a carrier in the shared spectrum.

24. The apparatus of claim 23, further comprising:
means for determining that a user equipment (UE) is in a stand-alone operating mode, wherein the means for identifying the source carrier is operable to determine that the UE is in the stand-alone operating mode.

25. The apparatus of claim 15, wherein means for identifying the source carrier for the uplink grant comprises:
means for identifying a carrier in the licensed spectrum, wherein the uplink grant is cross-carrier controlled by the identified carrier.

26. The apparatus of claim 25, further comprising:
means for receiving signaling indicative of a cross-carrier scheduling configuration, wherein the means for identifying the source carrier is operable to identify the licensed spectrum based at least in part on the received signaling.

27. The apparatus of claim 15, wherein a preamble transmitted using resources indicated by the uplink grant is based at least in part on the source carrier for the uplink grant.

28. The apparatus of claim 27, wherein the source carrier comprises a carrier in the shared spectrum and the preamble comprises a wireless local area network (WLAN) preamble.

29. An apparatus for wireless communications, comprising:
  a processor; and
  memory coupled to the processor, wherein the processor is configured to:
    identify a source carrier for an uplink grant;
    determine a listen-before-talk (LBT) procedure for accessing a channel of a shared spectrum based at least in part on the source carrier for the uplink grant; and
    select a period for the LBT procedure based at least in part on whether the source carrier is in a shared spectrum or in a licensed spectrum,
    wherein the period of the LBT procedure comprises a first duration if the source carrier is in the shared spectrum and a second duration greater than the first duration if the source carrier is in the licensed spectrum.

30. The apparatus of claim 29, wherein the processor is configured to:
  determine a CCA period based at least in part on the source carrier for the uplink grant.

31. The apparatus of claim 30, wherein the CCA period comprises a third duration if the source carrier is in the shared spectrum and the CCA period comprises a fourth duration if the source carrier is in the licensed spectrum, wherein the fourth duration is greater than the third duration.

32. The apparatus of claim 29, wherein the processor is configured to:
  determine a CCA procedure based at least in part on the source carrier for the uplink grant.

33. The apparatus of claim 32, wherein the determined CCA procedure comprises a CCA procedure without a backoff procedure.

34. The apparatus of claim 32, wherein the determined CCA procedure comprises a linear random or an exponential backoff procedure.

35. The apparatus of claim 34, wherein the processor is configured to:
  determine an LBT priority class for the exponential backoff procedure.

36. The apparatus of claim 34, wherein the processor is configured to:
  select a first range parameter for the backoff procedure if the source carrier is in the shared spectrum; and
  select a second range parameter for the backoff procedure if the source carrier is in the licensed spectrum, wherein the second range parameter is greater than the first range parameter, wherein the first range parameter and the second range parameter are different from a range parameter associated with a base station from which the uplink grant is received.

37. The apparatus of claim 29, wherein the processor is configured to:
  identify a carrier in the shared spectrum.

38. The apparatus of claim 37, wherein the processor is configured to:
  determine that a user equipment (UE) is in a stand-alone operating mode, wherein the source carrier is identified based at least in part on the determination that the UE is in the stand-alone operating mode.

39. The apparatus of claim 29, wherein the processor is configured to:
  identify a carrier in the licensed spectrum, wherein the uplink grant is cross-carrier controlled by the identified carrier.

40. The apparatus of claim 39, wherein the processor is configured to:
  receive signaling indicative of a cross-carrier scheduling configuration, wherein the carrier in the licensed spectrum is identified based at least in part on the received signaling.

41. The apparatus of claim 29, wherein a preamble transmitted using resources indicated by the uplink grant is based at least in part on the source carrier for the uplink grant.

42. The apparatus of claim 41, wherein the source carrier comprises a carrier in the shared spectrum and the preamble comprises a wireless local area network (WLAN) preamble.

43. A non-transitory computer-readable medium for storing instructions executable by a processor, comprising:
  instructions to identify a source carrier for an uplink grant;
  instructions to determine a listen-before-talk (LBT) procedure for accessing a channel of a shared spectrum based at least in part on the source carrier for the uplink grant; and
  instructions to select a period for the LBT procedure based at least in part on whether the source carrier is in a shared spectrum or in a licensed spectrum,
  wherein the period of the LBT procedure comprises a first duration if the source carrier is in the shared spectrum and a second duration, the second duration being greater than the first duration if the source carrier is in the licensed spectrum.

44. The non-transitory computer-readable medium of claim 43, further comprising:
  instructions to determine a CCA period based at least in part on the source carrier for the uplink grant.

45. The non-transitory computer-readable medium of claim 44, wherein the CCA period comprises a third duration if the source carrier is in the shared spectrum and the CCA period comprises a fourth duration if the source carrier is in the licensed spectrum, wherein the fourth duration is greater than the third duration.

46. The non-transitory computer-readable medium of claim 43, further comprising:
  instructions to determine a CCA procedure based at least in part on the source carrier for the uplink grant.

47. The non-transitory computer-readable medium of claim 46, wherein the determined CCA procedure comprises a CCA procedure without a backoff procedure.

48. The non-transitory computer-readable medium of claim 46, wherein the determined CCA procedure comprises a linear random or an exponential backoff procedure.

49. The non-transitory computer-readable medium of claim 48, further comprising:
  instructions to determine an LBT priority class for the exponential backoff procedure.

50. The non-transitory computer-readable medium of claim 48, further comprising:
  instructions to select a first range parameter for the backoff procedure if the source carrier is in the shared spectrum; and
  instructions to select a second range parameter for the backoff procedure if the source carrier is in the licensed spectrum, wherein the second range parameter is greater than the first range parameter, wherein the first range parameter and the second range parameter are different from a range parameter associated with a base station from which the uplink grant is received.

51. The non-transitory computer-readable medium of claim 43, further comprising:
instructions to identify a carrier in the shared spectrum.

52. The non-transitory computer-readable medium of claim 51, further comprising:
instructions to determine that a user equipment (UE) is in a stand-alone operating mode, wherein the source carrier is identified based at least in part on the determination that the UE is in the stand-alone operating mode.

53. The non-transitory computer-readable medium of claim 43, further comprising:
instructions to identify a carrier in the licensed spectrum, wherein the uplink grant is cross-carrier controlled by the identified carrier.

54. The non-transitory computer-readable medium of claim 53, further comprising:
instructions to receive signaling indicative of a cross-carrier scheduling configuration, wherein the carrier in the licensed spectrum is identified based at least in part on the received signaling.

55. The non-transitory computer-readable medium of claim 43, wherein a preamble transmitted using resources indicated by the uplink grant is based at least in part on the source carrier for the uplink grant.

56. The non-transitory computer-readable medium of claim 55, wherein the source carrier comprises a carrier in the shared spectrum and the preamble comprises a wireless local area network (WLAN) preamble.

* * * * *